(12) United States Patent
Lancashire et al.

(10) Patent No.: US 6,255,987 B1
(45) Date of Patent: Jul. 3, 2001

(54) BLOCK ADAPTIVE QUANTIZATION

(75) Inventors: David C Lancashire, Emsworth; Bartholomew A. F. Barnes, Portchester; Stephen J Udall, Petersfield, all of (GB)

(73) Assignee: Matra Marconi Space UK Limited (GB)

( * ) Notice: Subject to any disclaimer, the term of this patent is extended or adjusted under 35 U.S.C. 154(b) by 0 days.

(21) Appl. No.: 09/420,397

(22) Filed: Oct. 18, 1999

(30) Foreign Application Priority Data

Oct. 16, 1998 (GB) .................................................. 9822573

(51) Int. Cl.[7] .................................................. G01S 13/90
(52) U.S. Cl. ............................. 342/197; 342/25; 342/194; 342/195
(58) Field of Search .............................. 342/25, 195, 194, 342/204, 197; 382/232

(56) References Cited

U.S. PATENT DOCUMENTS 5,666,121 * 9/1997 Fang et al. ............................. 342/25

OTHER PUBLICATIONS

Monet et al., "Block Adaptive Quantization of Images," IEEE Transactions on Communications, vol. 41, No. 2, Feb. 1993.*

Kwok et al., "Block Adaptive Quantization of Magellan SAR Data," IEEE Transactions on Geoscience and Remote Sensing, vol. 27, No. 4, Apr. 1989.*

Owens et al., "Compression of Synthetic Aperture Radar Phase History Data Using Trellis Coded Quantization Techniques," Proceedings of the International Conference on Image Processing, 0/1997.*

* cited by examiner

*Primary Examiner*—Ian J. Lobo
(74) *Attorney, Agent, or Firm*—Kirschstein, et al.

(57) ABSTRACT

A block adaptive quantization device processes blocks of input data samples to determine an aggregate or average value which is applied to each of a number of exponent look-up tables to derive an exponent value dependent on the extent of compression required. The exponent value is split by an exponent splitter into a remainder value and a shift value. The remainder value is used to select one of a number of divide look-up tables to which the unsigned data sample is applied, and the shift value is used to apply a variable bit shift to the data sample. Each divide look-up table comprises the same group of divide look-up tables. The combination of the four look-up tables in the group, together with the variable bit shift defines a series of code tables made up of a group of divide look-up tables repeated at six dB intervals. The remainder value selects one of the code tables within the group, and the bit shift operation determines the selected one of the repeated groups. The code tables within the group are spaced logarithmically, as are the groups themselves. This arrangement considerably reduces the number of look-up tables required for a given processor, reducing the memory requirement and increasing speed.

18 Claims, 1 Drawing Sheet

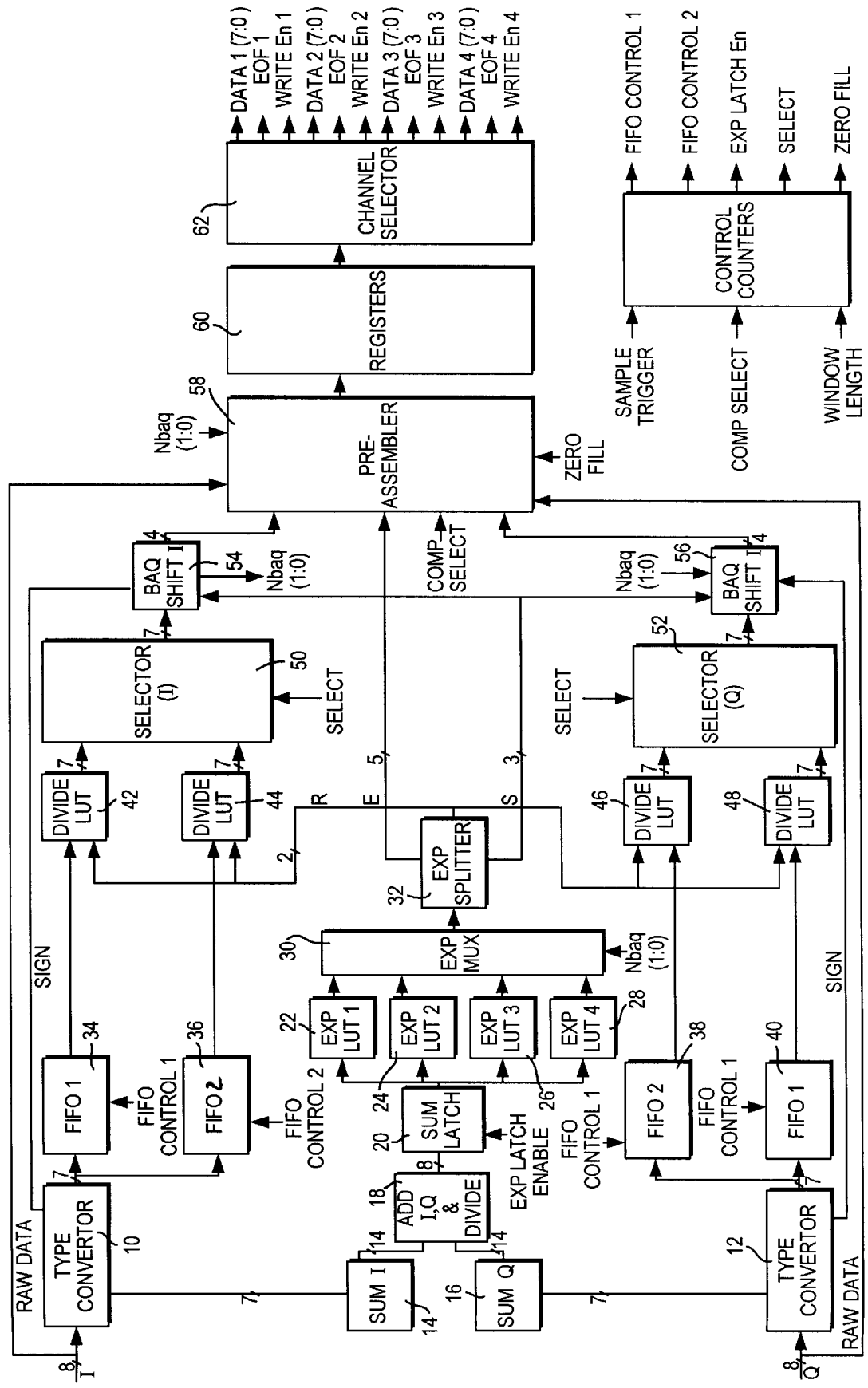

BLOCK ADAPTIVE QUANTIZATION

BACKGROUND OF THE INVENTION

This invention relates to block methods and apparatus for the adaptive quantisation of data and in particular but not exclusively to such methods and apparatus for the block adaptive quantisation of radar data.

In a typical pulse compression radar system, radar data is captured, converted to digital form, compressed and downloaded to a ground station for reconstruction and analysis of the data. The data from a pulse compression radar is characterised by having a gaussian noise-like distribution and so normal compression techniques such as the JPEG format are unsuitable. Accordingly a different form of compression is required and Block Floating Power Quantisation (BFPQ) or Block Adaptive Quantisation (BAQ) is often used. It is used to compress the data generated by the reception chains so that the data rate is low enough to be handled by the subsequent logic circuits.

In a typical synthetic aperture radar using BAQ compression, sample pairs are compressed using a block adaptive quantisation algorithm The BAQ algorithm operates on successive blocks of data, of known length The exponent for each block of data is calculated by summing the total of both the samples of the block and determining an exponent value.

The sample data is divided by the exponent value and this is done by using look-up tables. However, in a typical application for the Advanced Synthetic Aperture Radar (ASAR) developed for the European Space Agency, a BAQ device had a block size of 63 sample pairs, and required a large number of look-up tables (256) to produce the exponent and the compressed digital values. Also the operating speed of the device was slow in view of the large number of look-up tables required.

SUMMARY OF THE INVENTION

We have developed a BAQ method and apparatus which employs a novel combination of look-up tables and bit shift for processing of the I and Q samples, which reduces the number of look-up tables required and results in a faster operation. Furthermore, in a conventional BAQ process the code tables are spaced linearly. This means that, on a fractional quantisation error curve, the curves are bunched together at the top end of the graph. In a preferred embodiment we provide a logarithmic distribution of the curves and the code tables, thereby giving a more uniform fractional error.

Accordingly in one aspect this invention provides a method for the block adaptive quantisation of data, which comprises processing a block of input data samples to derive an aggregate or average value, using said aggregate or average value to derive an exponent value (E), determining compressed values of said data samples from a plurality of divide look-up tables and applying a bit shift operation, the look-up table and bit shift each being selected in accordance with the selected exponent value (E), and outputting said compressed data.

Preferably said aggregate or average value is applied to an exponent look-up table to determine said exponent value.

Where the system is required to apply different degrees of compression, the exponent value (E) may be obtained from one of a number of look-up tables, with the look-up table to which the aggregate or average value is applied being selected in accordance with the degree of compression required.

Preferably the exponent value (E) is processed to give a remainder value (R) which is used to select one of said divide look-up tables, and a shift value (S) which is used to apply a variable bit shift operation to the data sample.

The bit shift operation may be applied to the data value output by said selected divide look-up table (after the division operation), or it may be applied to the data sample before application to the selected divide look-up table.

Advantageously, the divide look-up tables and the bit shift values together define a series of code tables which spans at least part of the dynamic range of the input samples, with the series of code tables being made up of a preset number of repeated groups of code tables, and the shift value (S) of the exponent value (E) being used to select one of said groups of code tables and the remainder value (R) being used to select one of said code tables in the group.

The code tables within each group and the groups of code tables themselves are preferably spaced logarithmically with respect to the dynamic range of the input data samples.

In the illustrated embodiment, the groups of code tables are spaced at substantially 6 dB, and each group compresses four code tables spaced at substantially 1.5 dB.

In one particular embodiment having four divide look-up tables, the exponent value is 5 bits wide and of the form $(S_2,S_1,S_0,R_1,R_0)$, wherein $(S_2,S_1,S_0)$ represents the shift value (S) and $(R_1,R_0)$ represents the remainder value R. Where the input data is supplied in the form of in phase and quadrature samples (In, Qn) respectively, and the exponent value (E) may be calculated according to the following formulae, according to the level of compression required:

(i) where compression to 2, 3 or 4 bit is required $$E = \text{INT}\left[k \times \log_2\left(1 + \frac{\sum_{N=1}^{LBAQ}(|I_n| + |Q_n|)}{LBAQ}\right) - C\right]$$

where k is a constant, LBAQ is the number of sample pairs in a block, and C is a respective constant dependent on the extent of compression required, or (ii) where compression to 1 bit is required $$E = \text{INT}\left(\frac{\sum_{N=1}^{LBAQ}(|I_n| + |Q_n|)}{LBAQ}\right)$$

with In, Qn and LBAQ as defined above.

In another aspect, this invention provides a method for the block adaptive quantisation data, which comprises:

processing a block of data samples to obtain an aggregate or average value of said block;

using said aggregate or average value to obtain an exponent value;

deriving from said exponent value a first parameter and a second parameter;

applying to said data samples a division operation selected on the basis of one of said parameters, and a variable bit shift operation on the basis of the other of said parameters, to obtain compressed data values, and outputting said compressed data values and said exponent value.

In yet another aspect this invention provides apparatus for applying block adaptive quantisation to a block of data samples, said apparatus including:

means for processing a block of input data samples to determine an aggregate or average value;

means for deriving from said aggregate or average value an exponent value;

compression means for applying to said data samples a division operation and a variable bit shift operation each selected in accordance with said exponent value, to obtain compressed data, and output means for outputting said compressed data.

Said compression means preferably includes;

means for processing said exponent value to obtain a first parameter value and a second parameter value, a plurality of divide look-up tables, division means for applying said data samples to a divide look-up table selected in accordance with one of said parameters, and bit shift means for applying a variable bit shift operation to said data in accordance with the other of said parameters.

Whilst the invention has been described above it extends to any of the inventive combination of the features set out above or in the following description.

BRIEF DESCRIPTION OF THE DRAWINGS

The invention may be performed in various ways, and an embodiment thereof will now be described by way of example only, reference being made to the accompanying drawing, which is a schematic view of a block adaptive quantisation device in accordance with this invention.

DETAILED DESCRIPTION OF THE PREFERRED EMBODIMENT

Referring generally to the FIGURE, the input to the BAQ device is in the form of two 8-bit samples representing I and Q data. The main function of the BAQ device is to perform data compression on the I and Q samples using a block adaptive quantisation algorithm and to output the compressed data over four 9-bit parallel busses.

The output compressed data is represented as 1,2,3, or 4 bit samples and a corresponding exponent value for each block of data. The device may also act in transparent mode, where no compression is applied, for example for calibration.

The device comprises two main paths, for the I and Q samples respectively. During a sample window the I and Q data arrives in two continuous streams; although the stream is continuous, the BAQ compression operates on each consecutive block of BAQ (128) samples. The 8-bit I and Q samples pass to respective type convertors 10, 12 which operate to strip off the sign bit (the MS bit) and to output the sign, value and raw data. The I and Q values pass to respective adders 14, 16 which sum the total |I| and |Q| values respectively in the 128 sample block, and supply the 14 bit sums to an adder/divider 18 which adds the I and Q sums together and divides by the number of sample pairs in the block (128) to obtain an 8-bit average value which is output to a sum latch 20. The value in the sum latch 20 is applied to four exponent look-up tables 22, 24, 26, 28 which contain the relevant exponents applicable for compression of 1-bit, 2-bits, 3-bits and 4-bits respectively, as to be described. Although for convenience item 22 is referred to as a look-up table, in fact it may simply pass the data straight through as, for 1 bit compression, the value held on the sum latch 20 is used as the exponent.

The exponent E is determined for each block of LBAQ samples apart from the last BAQ block in a sample window, where the exponent E for the previous block is used. Where compression to 2, 3, or 4 bits is required, the following formula is used.

$$E = \text{INT}\left[k \times \log_2\left(1 + \frac{\sum_{N=1}^{LBAQ}(|I_n|+|Q_n|)}{LBAQ}\right) - C\right]$$

where the value of k is 4 and the value of C depends on the degree of compression (Nbaq):

Nbaq=2, C=2.2393

Nbaq=3, C=5.2955

Nbaq=4, C=8.5141

Where compression to 1-bit is required (Nbaq=1) the exponent is calculated according to the following formula:

$$E = \text{INT}\left(\frac{\sum_{N=1}^{LBAQ}(|I_n|+|Q_n|)}{LBAQ}\right)$$

Thus for 1-bit compression the exponent is the integer value corresponding to the average value of the sample pairs in the block.

The outputs from the look-up tables 22, 24, 26, 28 are passed to an exponent multiplexer 30 which selects the 5-bit exponent output of the appropriate look-up table for the required compression in accordance with Nbaq.

In accordance with this invention, this embodiment employs a combination of a bit shift and divide look-up tables to compress the sample values. This means that fewer look-up tables are required and the look-up tables are smaller and so the speed of operation can be increased. The exponents are selected according to the formulae above, such that the code tables which effect the compression are repeated at 6 dB intervals. By doing this it is possible to effect the division required by providing a set of, say, four divide code tables spaced generally uniformly and logarithmically with respect to each other and then using a bit shift either before or after the divide code table. Thus the selected exponent E is supplied to an exponent splitter 32 which splits the 5-bit exponent to obtain two parameters. The three most significant bits are utilised to determine which group of four divide code tables are used, and the two least significant bits are used to determine which of the four tables is used in the group. Thus if E is represented as $(S_2,S_1,S_0,R_1,R_0)$, the S parameter (or bit shift) equates to E/4 and the R parameter (or code table select) equates to E mod 4.

Depending on the number of bits per compressed sample required (Nbaq=2,3,or 4), the number of division factors is ((8−Nbaq)×4+1). This may be visualised as four division factors for each bit shift required for the maximum compression, and one extra division. Thus for Nbaq=4, one of 17 division factors is applied Nbaq=3 one of 21 division factors is applied Nbaq=2 one of 25 division factors is applied The four code tables are repeated every 6 dB, corresponding to a bit shift (i.e. division by 2) every 6 dB, and so the selection of the group of code tables is performed by a bit shift by S bits (i.e. a division by $2^{E/4}$). The combination of the variable bit shift and divide operation by the look-up table provides a series of code tables which span the dynamic range of the signal.

From the type converters 10 12, odd and even blocks of sample data are passed alternatively into pairs of FiFo registers (FiFo1, FiFo2) 34, 36, 38, 40 to be stored whilst the exponent is accumulated and the division factors are set up. This configuration also allows 2 blocks of data in each BAQ channel to be operated on at the same time. The outputs of the FiFos all pass to divide look-up tables blocks 42, 44, 46, 48. Each look-up table block is the same and contains four look-up tables. Each look-up table block receives the 2 bit R parameter which selects one of the four tables for current use. The divide look-up tables provide an output value as follows:

$$Output = int\left(\frac{ADC + 0.5}{R}\right)$$

Where ADC is the digital value from the FiFo and R is the two bit R value from the exponent splitter.

The outputs from the divide look-up tables are supplied to respective selectors 50, 52, which operate to select in ping pong fashion blocks of divided sample data from the selected look-up tables 42, 44, 46, 48. The divided sample data passes from the selectors to respective BAQ shift devices 54, 56 which apply an adjustable bit shift of up to 7 bits in accordance with the 3-bit parameter S.

Accordingly, the divide look-up tables 42–48 and the BAQ shift devices 54, 56 together scale the samples by the division factor of the block, and the (Nbaq−1) least significant bits of each of the resulting scaled samples in the block are selected. Wherever any of the bits in the scale sample more significant than the (Nbaq−1) bits selected are 1, all the (Nbaq31 1) selected bits are set to 1 (saturated). The sign bit is added as the most significant bit, to give Nbaq bits.

From the BAQ shift devices 54, 56, the data in this form is supplied to a pre-assembler 58 which packs the selected bits from the samples into consecutive 32 bit words, of compressed I and Q values. Packing with zeros is not acceptable, except where the BAQ block is the last in a sample window and the number of samples remaining is less than 128, in which case the remaining sample I and Q values may be 0's. The eight bit exponent E for each block of 128 compressed samples is also added at the end of each block, with the MS 3 bits of E being set to 0, or incorporating an error check code such as a parity bit or check sum bit.

Output samples (compressed or uncompressed) are in the form of binary magnitude and sign (MS bit sign is the sign bit with 0 signifying positive, and 1 negative). The sign and number scheme is such that 0000 0000 represents 0.5, 0000 0001 represents 1.5 and so on, and for numbers below zero 1 000 0000 represents −0.5, 1000 0001 represents −1.5 etc. Note that when Nbaq=1 (compression to one bit) there is no magnitude, only sign.

From the pre-assembler 58, the words are stored in a series of registers 60 and then distributed amongst the four output channels by a channel selector 62.

The number of bits per compressed sample is selectable during operation. Samples digitised during an echo window are compressed; samples digitised during calibration windows are not compressed.

Thus, in a transparent mode of operation, the device may also pass samples uncompressed to the pre-assembler 54.

For reconstruction of the compressed data, the following equation is used:

$$VALUE = (N+0.5) \times 2^{EXP/4}$$

where VALUE is the original data value required, N is the compressed I or Q value produced by the selected BAQ compression process, and EXP is the value of the exponent of the block containing the I or Q value. Note that EXP is the exponent following the data value used. The exponent is an unsigned binary value. N is a signed binary value as defined below. The values shown are for 4 -bit BAQ. Note that the MSB is the Sign bit.

| N (Binary) | Value |
|---|---|
| 1111 | −8 |
| 1110 | −7 |
| 1101 | −6 |
| 1100 | −5 |
| 1011 | −4 |
| 1010 | −3 |
| 1001 | −2 |
| 1000 | −1 |
| 0000 | 0 |
| 0001 | 1 |
| 0010 | 2 |
| 0011 | 3 |
| 0100 | 4 |
| 0101 | 5 |
| 0110 | 6 |
| 0111 | 7 |

The device described above, by use of the bit shift operation in combination with the divide look-up tables, effectively adapts the system gain from one block of samples to the next so that the quantiser operates near its optimum point at all times. The logarithmic spacing results in a total of 19 look up tables (3 exponent look-up tables and 4 look-up tables in each of components 42, 44, 46 and 48) rather than 256 as used in the ASAR discussed above.

What is claimed is:

1. A method for the block adaptive quantisation of data, which comprises the steps of: processing a block of input data samples to derive an aggregate or average value, using said aggregate or average value to derive an exponent value (E), determining compressed values of said data samples from a plurality of divide look-up tables and applying a bit shift operation, the look-up table and bit shift each being selected in accordance with the selected exponent value (E), and outputting said compressed data.

2. A method according to claim 1, wherein said aggregate or average value is applied to an exponent look-up table to determine said exponent value.

3. A method according to claim 1, including the step of applying different degrees of compression, wherein the exponent value (E) is obtained from one of a number of look-up tables, and the look-up table to which the aggregate or average value is applied is selected in accordance with the degree of compression required.

4. A method according to claim 1, wherein the exponent value (E) is processed to give a remainder value (R) which is used to select one of said divide look-up tables, and a shift value (S) which is used to apply a variable bit shift operation to the data sample.

5. A method according to claim 4, wherein said bit shift operation is applied to the data value output by said selected divide look-up table.

6. A method according to claim 4, wherein said bit shift operation is applied to the data sample before application to the selected divide look-up table.

7. A method according to claim 4, wherein the divide look-up tables and the bit shift values together define a series of code tables which spans at least part of the dynamic range of the input samples, with the series of code tables being made up of a preset number of repeated groups of code tables, and wherein the shift value (S) of the exponent value (E) is used to select one of said groups of code tables and the remainder value (R) is used to select one of said code tables in the group.

8. A method according to claim 7, wherein the code tables within each group are spaced logarithmically with respect to the dynamic range of the input data samples.

9. A method according to claim 7, wherein the groups of code tables are spaced logarithmically with respect to the dynamic range of the input data samples.

10. A method according to claim 9, wherein the groups of code tables are spaced at substantially 6 dB.

11. A method according to claim 10, wherein each group comprises four code tables spaced at substantially 1.5 dB.

12. A method according to claim 8, wherein there are four divide look-up tables and the exponent value is 5 bits wide and of the form $(S_2,S_1,S_0,R_1,R_0)$, and wherein $(S_2,S_1,S_0)$ represents the shift value (S) and $(R_1,R_0)$ represents the remainder value R.

13. A method according to claim 11, wherein the input data is supplied in the form of in phase and quadrature samples (In, Qn) respectively and the exponent value (E) is calculated according to the following formulae according to the level of compression required:

(i) where compression to 2, 3 or 4 bit is required $$E = \text{INT}\left[k \times \log_2\left(1 + \frac{\sum_{N=1}^{LBAQ}(|I_n|+|Q_n|)}{LBAQ}\right) - C\right]$$

where k is a constant, LBAQ is the number of sample pairs in a block, and C is a respective constant dependent on the extent of compression required, or (ii) where compression to 1 bit is required $$E = \text{INT}\left(\frac{\sum_{N=1}^{LBAQ}(|I_n|+|Q_n|)}{LBAQ}\right)$$

with In, Qn and LBAQ as defined above.

14. A method for the block adaptive quantisation of data which comprises the steps of:

processing a block of data samples to obtain an aggregate or average value of said block;

using said aggregate or average value to obtain an exponent value;

deriving from said exponent value a first parameter and a second parameter;

applying to said data samples a division operation selected on the basis of one of said parameters, and a variable bit shift operation on the basis of the other of said parameters, to obtain compressed data values, and outputting said compressed data values and said exponent value.

15. Apparatus for applying block adaptive quantisation to a block of data samples, said apparatus including:

means for processing a block of input data samples to determine an aggregate or average value;

means for deriving from said aggregate or average value an exponent value;

compression means for applying to said data samples a division operation and a variable bit shift operation each selected in accordance with said exponent value, to obtain compressed data, and output means for outputting said compressed data.

16. Apparatus according to claim 15, wherein said compression means includes;

means for processing said exponent value to obtain a first parameter value and a second parameter value, a plurality of divide look-up tables, division means for applying said data samples to a divide look-up table selected in accordance with one of said parameters, and bit shift means for applying a variable bit shift operation to said data in accordance with the other of said parameters.

17. Apparatus according to claim 16, wherein said bit shift means operates on the data output from said divide look-up tables.

18. Apparatus according to claim 15, which is further operable in a transparent mode to pass the data samples without compression.

* * * * *